United States Patent
Torborg et al.

(12)

(10) Patent No.: US 7,034,075 B1
(45) Date of Patent: Apr. 25, 2006

(54) LOW GLOSS POWDER COATING COMPOSITIONS

(75) Inventors: Charles J. Torborg, Blaine, MN (US); Jeffrey G. Schmierer, Centerville, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 681 days.

(21) Appl. No.: 09/724,493

(22) Filed: Nov. 28, 2000

(51) Int. Cl.
*C08L 67/06* (2006.01)

(52) U.S. Cl. ........................ 525/170; 525/934; 525/208

(58) Field of Classification Search ................ 525/170, 525/934, 208
See application file for complete search history.

(56) References Cited

U.S. PATENT DOCUMENTS

| | | | |
|---|---|---|---|
| 4,242,253 A | 12/1980 | Yallourakis | |
| 4,419,495 A | 12/1983 | Davis | |
| 5,436,311 A * | 7/1995 | Hoebeke et al. | ............ 525/174 |
| 5,491,202 A | 2/1996 | Umehara et al. | |
| 5,543,464 A * | 8/1996 | Decker et al. | .............. 525/176 |
| 5,684,067 A | 11/1997 | Muthiah et al. | |
| 5,744,522 A | 4/1998 | Prucnal et al. | |
| 6,093,774 A | 7/2000 | Dumain | |
| 6,296,939 B1 * | 10/2001 | Kunze et al. | ................ 428/413 |
| 6,407,181 B1 * | 6/2002 | Daly et al. | ................... 525/408 |
| 6,555,226 B1 * | 4/2003 | Kulzick et al. | ............. 428/413 |

FOREIGN PATENT DOCUMENTS

| | | |
|---|---|---|
| EP | 0 465 176 | 1/1992 |
| JP | 07048529 | 2/1995 |
| JP | 07188587 | 7/1995 |
| JP | 11080606 | 3/1999 |
| WO | WO 94/01504 | 1/1994 |
| WO | WO 94/01505 | 1/1994 |
| WO | WO 01/16238 | 3/2001 |

\* cited by examiner

*Primary Examiner*—Margaret G. Moore
(74) *Attorney, Agent, or Firm*—Bin Su

(57) ABSTRACT

The invention is directed to a low gloss powder coating composition comprising a first component (a) and a second component (b). The first component (a) comprises a mixture of (i) at least one glycidyl group-containing acrylic resin having epoxide equivalent weight of from about 250 to about 1500 and glass transition temperature of from about 30° C. to about 80° C.; and (ii) a curing agent. The second component (b) comprises at least one carboxyl-group containing material having acid number of from about 10 to about 300 and is not substantially compatible with the first component (a). The two components are dry-blended to obtain the powder coating composition.

24 Claims, No Drawings

LOW GLOSS POWDER COATING COMPOSITIONS

FIELD OF INVENTION

The invention is directed to a powder coating composition comprising two dry-blended components and to a low gloss coating produced therefrom.

BACKGROUND OF INVENTION

Low gloss powder coatings are needed in industries such as the automotive and furniture industries. Traditionally, the gloss is reduced by the formation of a minute surface texture, which scatters the light at the coating surface. In doing so, additives or fillers are incorporated into the coating composition to form minute surface irregularities. However, gloss reduction through incorporating additives or fillers often sacrifices physical properties of the cured coating. Compounding into a powder coating composition two components exhibiting different curing reaction rates can also reduce the gloss of the cured coating. However, this way of reducing gloss is limited to certain powder compositions since it is dependent on specific resins and curatives, and gloss is sensitive to heating rates.

Some low gloss coating compositions have been proposed. For example, U.S. Pat. No. 6,093,774 describes a low gloss powder coating composition comprising a glycidyl-containing acrylic polymer, and two acid functional crosslinkers.

U.S. Pat. No. 5,744,522 discloses a low gloss coating composition comprising a glycidyl group containing acrylic copolymer; an aromatic polyester containing carboxyl groups; and an isocyanurate curing agent.

U.S. Pat. No. 5,684,067 discloses a low gloss coating powder composition comprising polyester resin; triglycidyl isocyanurate (TGIC); a copolymer of ethylene and acrylic and/or methacrylic acid; a compound selected from 2-mercapto benzothiazole and metal salts of 2-mercapto benzothiazole.

U.S. Pat. No. 5,491,202 discloses a low gloss powder coating comprising three thermosetting polyester resins and a hardener, e.g., glycidyl compound, amide compound, blocked isocyanate compound, etc.

U.S. Pat. No. 5,436,311 discloses a matte powder coating composition comprising a mixture of a linear carboxyl polyester and glycidyl acrylic copolymer.

Other low gloss coating compositions are proposed in U.S. Pat. No. 4,419,495 and U.S. Pat. No. 4,242,253.

In spite of all the efforts made to reduce the gloss, it has been difficult to lower the gloss of the epoxy functional acrylic powder coatings without sacrificing considerable physical properties, or compromising appearance.

SUMMARY OF THE INVENTION

Surprisingly, the invention provides a powder coating composition that exhibits, upon cure, a low gloss and the gloss is reduced without a significant impact on physical properties such as chemical resistance, adhesion, weatherability, and hardness.

The invention provides a low gloss powder coating composition comprising
a). a first component comprising a mixture of
   (i). at least one glycidyl group-containing acrylic resin having epoxide equivalent weight of from about 250 to about 1500 and glass transition temperature of from about 30° C. to about 80° C.; and
   (ii). a curing agent selected from dicarboxylic acids, dicarboxylic acid anhydrides, and mixtures thereof; and
b). a second component dry-blended with said first component (a), comprising at least one carboxyl-group containing material that has an acid number of from about 10 to about 300 and that is not substantially compatible with said first powder (a).

In another aspect, the invention provides a low gloss powder coating composition comprising
a). a first component comprising a mixture of
   (i). at least one glycidyl group-containing acrylic resin having epoxide equivalent weight of from about 250 to about 1500 and glass transition temperature of from about 30° C. to about 80° C.; and
   (ii). a dicarboxylic acid anhydride curing agent, the ratio of the curing agent (ii) to the glycidyl groups in component (i) being from about 0.4 to about 0.7; and
b). a second component dry-blended with said first component (a), comprising at least one carboxyl-group containing material that has an acid number of from about 10 to about 300 and that is not substantially compatible with said first component (a), wherein said powder coating composition is substantially free of blooming when applied on a wood substrate and upon cure.

In yet another aspect, the invention provides a process of making the powder coating composition comprising melt-blending ingredients (i) and (ii) to obtain a first component (a); and dry-blending said first component (a) with a second component (b) to obtain the powder coating composition in powder form.

In yet another aspect, the invention provides an article comprising a substrate and a cured coating coated on a surface of the substrate. The cured coating is formed from any of the aforementioned powder coating compositions of the invention.

The powder coating composition of the invention can be formulated to exhibit, upon cure, low gloss, i.e., 60° gloss of less than about 55, and preferably, from about 10 to about 40, when measured according to ASTM D523.

The powder coating composition of the invention can also be formulated to exhibit, upon cure, desirable hardness, i.e., pencil hardness of up to 6H, preferably, from about H to about 6H, more preferably, from about 2H to about 6H, when measured according to ASTM D 3363.

The powder coating composition of the invention can also be formulated to be substantially free of blooming when applied on wood substrate and upon cure, i.e., no visible haze on the cured coating when the coated article is cooled slowly from about 200° F. to about 100° F. in approximately 30 minutes.

DETAILED DESCRIPTION OF THE INVENTION

As detailed above, the powder coating composition of the invention comprises a dry blend of a first component (a) and a second component (b). The first component (a) is an extruded blend comprising (i) at least one glycidyl group-containing acrylic resin; and (ii) a curing agent selected from dicarboxylic acids, dicarboxylic acid anhydrides, and mixtures thereof. The second component (b) comprises a carboxyl group-containing material.

Glycidyl-group containing acrylic resins useful in the invention have epoxide equivalent weight of from about 250 to about 1500, preferably, from about 250 to about 800 and glass transition temperature (Tg) of from about 30° C. to about 80° C., preferably, from about 35° C. to about 65° C.

Glycidyl-group containing acrylic resins useful in the invention include polymers and copolymers produced using at least one monomer having at least one glycidyl group and at least one ethylenically unsaturated bond in the molecule. Examples of such monomers include glycidyl acrylate, glycidyl methacrylate, beta-methylglycidyl acrylate, beta-methylglycidyl methacrylate, N-glycidyl acrylic acid amide and the like, among which glycidyl acrylate and glycidyl methacrylate are preferred. These monomers can be used alone or in combination of two or more. Other comonomers useful for obtaining glycidyl-group containing acrylic resins include styrene, substituted styrene, and ethylenically unsaturated monomers such as carboxylates, nitriles, amides. Examples of carboxylates include acrylic acid; methacrylic acid; acrylic acid derivatives such as methyl acrylate, ethyl acrylate, propyl acrylate, isopropyl acrylate, butyl acrylate, isobutyl acrylate, 2-ethylhexyl acrylate, dodecyl acrylate, stearyl acrylate, cyclohexyl acrylate, benzyl acrylate, hydroxyethyl acrylate, hydroxypropyl acrylate, hydroxybutyl acrylate, 1,4-butanediol monoacrylate and dimethylaminoethyl acrylate; methacrylic acid derivatives such as methyl methacrylate, ethyl methacrylate, propyl methacrylate, isopropyl methacrylate, butyl methacrylate, isobutyl methacrylate, 2-ethylhexyl methacrylate, dodecyl methacrylate, stearyl methacrylate, cyclohexyl methacrylate, benzyl methacrylate, phenyl methacrylate, hydroxyethyl methacrylate, hydroxylpropyl methacrylate, hydroxybutyl methacrylate, 1,4-butanediol monomethacrylate and dimethylaminoethyl methacrylate; etc. Such monomers may be used each separately or in the combination of two or more. Examples of amides include acrylamide, methacrylamide, vinylamide, N-methylolacrylamide and N-methylolmethacrylamide. Examples of nitriles include acrylonitrile and methacrylonitrile.

Preferred glycidyl-group containing acrylic resins include glycidyl methacrylate copolymers having epoxide equivalent weight of from about 250 to about 1,000 and glass transition temperature (Tg) of from about 35° C. to about 70° C., with glycidyl methacrylate copolymers having epoxide equivalent weight of from about 250 to about 800 and Tg of from about 40° C. to about 65° C. being more preferred.

Examples of commercially available glycidyl group containing acrylic resins include the Fine-Clad® series by Reichhold such as Fine-Clad®A-244-A, Fine-Clad® A-239-30A, Fine-Clad®A 254, Fine-Clad® A 257, and Fine-Clad® A 249A; Almatex™ PD 7690 and Almatex™ PD 3402 by Anderson Co.; and GMA-300™ and GMA-30 ™ by Estron Chemical Company.

Curing agents useful in the invention include dicarboxylic acids and anhydrides thereof. The dicarboxylic acids are compounds having two carboxyl groups. The dicarboxylic acid anhydrides are the anhydrides of the corresponding dicarboxylic acids having one or more anhydride groups in the molecule. For the purpose of the invention, the acids and anhydrides can be used alone or in combination.

Examples of useful dicarboxylic acids and anhydrides thereof include succinic acid, adipic acid, azelaic acid, sebacic acid, eicosanedioic acid, dodecanedioic acid, glutaric acid, pimelic acid, and anhydrides of such acids, with dodecanedioic acid and the anhydride thereof being preferred.

Examples of useful commercially available dicarboxylic acids and anhydrides thereof include DDDA from DuPont; and Additol® VXL 1381 from Hoechst.

The amounts of the glycidyl group containing acrylic resin and the curing agent in first component (a) are such that the stoichiometric ratio of the curing agent (ii) to the glycidyl groups existing in the glycidyl group containing acrylic resins (i) is from about 0.4 to about 1.5. The stoichiometric ratio can be adjusted depending on the applications. For example, when the powder coating composition of the invention is applied on wood substrate, the stoichiometric ratio is preferably from about 0.4 to about 0.7.

The second component (b) comprised in the composition of the invention includes at least one carboxyl-group containing material, i.e., a material that has an acid number of from about 10 to about 300. For the purpose of the invention, the carboxyl-group containing material useful in the invention is selected not to be substantially compatible with the first component (a), that is, the components (a) and (b) are not miscible under the cure conditions. Although not bound by any theory, applicants believe that the incompatibility of the dry-blended two components results in gloss reduction in the cured coatings of the invention because of minor roughness at the coating surface and light scattering due to differences of refractive index.

Preferred carboxyl-group containing material includes carboxylic acid functional polyester resins, carboxylic acid functional acrylic resins, carboxylic-group containing polyethylene and carboxylic-group containing polypropylene, and mixtures thereof.

Useful carboxylic acid functional polyesters may be produced using well-known polycondensation procedures employing an excess of acid to obtain a polymer having the specified acid number. The glycol residues of the polyester may be derived from a wide variety of aliphatic, alicyclic and alicyclic-aromatic glycols or diols containing from 2 to about 10 carbon atoms. Examples of such glycols include ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylenediol, hydrogenated bisphenol A, and the like.

The dicarboxylic acid residues of the polyester may be derived from various aliphatic, alicyclic, aliphatic-alicyclic and aromatic dicarboxylic acids containing about 4 to 10 carbon atoms or esterforming derivatives thereof such as dialkyl ester and/or anhydrides. Succinic acid, glutaric acid, adipic acid, azelaic acid, dodecanedioic acid, sebacic acid, fumaric acid, maleic acid, itaconic acid, 1,3- and 1,4-cylohexanedicarboxylic acids, phthalic acid, isophthalic acid and terephthalic acid are representative of the dicarboxylic acids from which the diacid residues of the amorphous polyester may be derived. A minor amount, e.g., up to 10 mole percent, of the glycol and/or diacid residues may be replaced with branching agents, e.g., trifunctional residues derived from trimethylolethane, trimethylolpropane and trimellitic anhydride.

Preferably, the carboxylic acid functional polyester resins have an acid number of from about 25 to about 250.

Examples of useful commercially available carboxylic acid functional polyester include the products under the tradename Uralac® P5700 and Uralac® P3042 from DSM Resins; the Crylcoat® series from UCB Chemicals such as Crylcoat® 340, Crylcoat® 440, Crylcoat® 630 and Crylcoat® 2988; and Grilesta® 7206 from UCB Chemicals.

The carboxylic acid functional acrylic resins useful in the invention are formed from typical acrylic monomers known in the art, such as acrylic acid or methacrylic acid; acrylic acid derivatives such as methyl acrylate, ethyl acrylate, propyl acrylate, isopropyl acrylate, butyl acrylate, isobutyl acrylate, 2-ethylhexyl acrylate, dodecyl acrylate, stearyl acrylate, cyclohexyl acrylate, benzyl acrylate, hydroxyethyl acrylate, hydroxypropyl acrylate, hydroxybutyl acrylate, 1,4-butanediol monoacrylate and dimethylaminoethyl acrylate; methacrylic acid derivatives such as methyl methacrylate, ethyl methacrylate, propyl methacrylate, isopropyl methacrylate, butyl methacrylate, isobutyl methacrylate, 2-ethylhexyl methacrylate, dodecyl methacrylate, stearyl methacrylate, cyclohexyl methacrylate, benzyl methacrylate, phenyl methacrylate, hydroxyethyl methacrylate, hydroxylpropyl methacrylate, hydroxybutyl methacrylate, 1,4-butanediol monomethacrylate and dimethylaminoethyl methacrylate; etc. Such monomers may be used each separately or in the combination of two or more. Other monomers such as styrene, substituted styrene, or vinyl toluene, etc. may also be incorporated. Commercially available examples of the carboxylic acid functional acrylic resins include the SCX™ series acrylic resins from Johnson Polymer, such as SCX™ 848, SCX™ 843, SCX™ 842 and SCX™ 820.

Preferably, the carboxylic acid functional acrylic resins have an acid number of from about 35 to about 300.

Carboxyl-group containing polyethylene and polypropylene include ethylene-acrylic acid copolymers, propylene-acrylic acid copolymers, propylene-methacrylic acid copolymers, ethylene-methacrylic acid copolymers, maleic anhydride polyethylene copolymers, and maleic anhydride ethylene copolymers.

Commercially available examples of the ethylene-acrylic acid copolymers and propylene-acrylic acid copolymers include the AC® series from Honeywell, such as AC®-540 and AC®-580.

Preferably, carboxyl-group containing polyethylene and polypropylene copolymers are ethylene-acrylic acid copolymers and propylene-acrylic acid copolymers having an acid number of from about 25 to about 125.

According to the invention, carboxyl-group containing material used as component (b) may be used separately or in combination of two or more in the powder coating composition of the invention. The composition may comprise from about 1% to about 40% by weight, preferably, from about 3% to about 25% by weight, and most preferably, about 5% to about 20% by weight of the carboxyl-group containing material, based on the total weight of the first and second components (a) and (b).

Optionally, the first component (a) and/or the second component (b) may also comprise a catalyst or a combination of more than one catalyst. Examples of useful catalysts may include tin catalysts, imidazoles, imidazole/epoxy adducts, tertiary amines, imidazolines, imidazoline salts of mono- or di-carboxylic acids, tetraalkylammonium salts, phosphonium salts, and mixtures thereof.

Examples of imidazoles may include substituted and unsubstituted imidazoles, such as imidazole, 2-methylimidazole, and 2-phenylimidazole. Examples of commercially available imidazole/epoxy adducts include EPON P-101 from Shell Chemical. Examples of tetraalkylammonium salts may include tetramethylammonium bromide, tetramethylammonium iodide, tetramethylammonium chloride, myrystyltrimethylammonium bromide, myrystyltrimethylammonium iodide, myrystyltrimethylammonium chloride, and the like. Examples of phosphonium salts may include ethyltriphenylphosphonium bromide, ethyltriphenylphosphonium iodide and ethyltriphenylphosphonium chloride, and the like. Examples of tertiary amines may include N,N-dimethylcyclohexylamine, N,N-dimethylaniline, N-methylmorpholine, N,N'-dimethylpiperazine, 2,2,6,6,-tetramethyl-4-dimethylaminopiperidine, N,N-dimethyloctadecylamine, N,N-dimethylhexadecylamine, 1,8-diazabicyclo[5.4.0]undec-7-ene, N,N,N',N'-tetramethylhexamethylenediamine, N,N,N',N', N"-pentamethyldiethylenetriamine, triethylenediamine and benzyldimethylamine. Examples of imidazolines include substituted and unsubstituted imidazolines, such as 2-phenylimidazoline. Imidazoline salts of mono- or di-carboxylic acids are derived from imidazoline-based compound and mono- or di-carboxylic acids. The imidazoline salts of mono- or di-carboxylic acids and their preparations are described, for example, in GB 2,312,897, which is incorporated herein by reference.

Preferably, the catalyst is a tin catalyst in which tin has a valence of two or four, such as stannous hexanoate, stannous octanoate, stannous laurate, stannous stearate, stannous 2-ethylhexanoate, stannous chloride, stannous bromide, dibutyltin dilaurate, butyl tin oxide, and mixtures thereof, among which stannous hexanoate, stannous octanoate, stannous laurate and stannous stearate are more preferred.

The total amount of the catalyst(s) used in the composition of the invention can be from about 0.1% to about 5% by weight, based on the total weight of the resins in the composition.

Optionally, the second component (b) may also comprises a crosslinking agent such as triglycidyl isocyanurate (TGIC); bisphenol A epoxies; hydroxyalkylamide such as Primid® XL-552 from EMS Chemie (North America). The amount of the crosslinking agent depends on the applications and the required performances.

In addition to the above, the component (a) and/or component (b) of the powder coating composition of the invention may also contain other additives that are common to powder coatings. These additives include, without limitation, fillers, slip additives, pigments, dyes, UV stabilizers, antioxidants, fluidizing agents, flow control agents, degassing agents, flexibilizing agents, and texturing agents, etc. For example, flow control agents such as acrylic compounds, e.g., Modaflow 2000 and Resiflow P-67; silicon compounds, e.g., Silwet® L-7500 from OSi Specialties, Inc.; and fluoropolymers, e.g., Fluorad™ FC-430 from 3M, are known in the coating or powder coating art and are generally incorporated into the powder coating compositions to modify the surface tension, thereby facilitating the coalescence and flow of the polymers as they are melted to provide a smoother finish of the final cured coating. Pigments may be added to give the powder coatings color. Examples of pigments include, but are not limited to, titanium dioxide, carbon black, organic and inorganic pigments of any available color depending on the application. The amounts of these additional additives depend upon the particular properties of the final coating desired.

In another aspect, the invention provides a process for making the powder coating composition of the invention. The process comprises melt-blending the ingredients (i) and (ii) to obtain the first component (a), and dry-blending the first component (a) with a second component (b) to obtain the powder coating composition of the invention. The second component (b) may be a carboxyl group containing material that does not need to be extruded and thus, may be directly added to the first component (a) in powder form to obtain the powder coating composition. Alternatively, the second component (b) may be prepared separately by melt-blending the carboxyl group containing material with other optional ingredients prior to being added to the first component (a).

Both the first component (a) and the second component (b) can be in any form such as powder, flakes, chips, prills, etc., prior to dry blending together.

Grinding and sieving may be performed before or after dry-blending to obtain the powder coating composition of appropriate particle size.

In one embodiment, the first component (a) is prepared by combining the ingredients (i) and (ii), and other optional ingredients, if present, and mixing them thoroughly. Then the mixture is extruded in an extruder, such as a single or a twin screw extruder. The extrudate is immediately cooled and ground in a mill, such as a Brinkman mill, a Bantam hammer mill, an Alpine Mill or an ACM Mill, and sieved to obtain a powder of appropriate particle size depending on the application. Then, the second component (b), which is a carboxyl group containing material that does not need to be extruded, is separately added to and mixed thoroughly with the component (a) to obtain the powder coating composition of the invention.

In another embodiment, the second component (b) is prepared by melt-blending the carboxyl group containing material with other optional ingredients including, e.g., a catalyst, a crosslinking agent, and/or other additives, if present. The extrudate is ground and sieved to obtain a powder of appropriate particle size of from about 0.1 micron to about 250 micron, preferably, from about 1 micron to about 100 micron and more preferably, from about 5 micron to about 60 micron. Then, two components, each being in powder form, are dry-blended together, i.e., one component, e.g., the second component (b) is separately added to, or mixed with the first component (a), or vise versa to obtain the powder coating composition of the invention.

In yet another embodiment, the first component (a) and the second component (b) are prepared by separately extruding each component with any other optional ingredients. Then the extrudates of the two components are mixed together, then, ground and sieved to obtain the powder composition of appropriate particle size.

In yet another embodiment, the second component (b) does not need to be extruded but may need to be ground. The component (b) can be separately added to the extrudate of the first component (a), and then, the two components are ground and sieved to obtain the powder composition.

Although a wide range of the particle sizes is useful for the purpose of the invention, typically, the average particle size of the powder coating composition of the invention is from about 5 microns to about 250 microns. Preferably, the average particle size is from about 10 microns to about 80 microns, and more preferably, from about 20 microns to about 55 microns.

The powder coating compositions of the invention can be applied to a variety of substrates such as metals, e.g., steel, or aluminum; glass; ceramic; carbon-fiber; and graphite. Particularly, the powder coating compositions of the invention can be readily applied to heat sensitive substrates such as plastic or fiber-reinforced plastic substrates, and especially wood substrates. For the purpose of the invention, "wood" includes natural wood and engineered wood such as plywood, particleboard, oriented strand board, hardboard, medium density fiberboard, and the like. Wood, pre-coated with a conductive liquid coating composition or engineered wood with compositions having enhanced conductivity may also be used as a substrate for the purpose of the invention. Wood having moisture content of from about 3 to about 10% by weight is preferred.

The powder coating composition of the invention can be applied onto at least one surface of a substrate using any conventional powder coating deposition technique, such as electrostatic spray, to obtain smooth and uniform coatings. Curing is achieved by heating the coated substrate at a temperature for a time sufficient to cure the composition. By addition of the catalyst(s), adjusting the type of catalyst(s) used and the level of the catalyst(s), the cure temperature of the powder coating compositions of the invention can be adjusted to a low temperature to accommodate heat sensitive substrates. For example, for coatings on heat sensitive substrates, the cure temperature is at about 300° F. or below, more preferably, at about 280° F. or below. The cure time varies depending on the cure temperature, the nature and the thickness of the substrate. Preferably, the cure time may be shorter than 30 minutes, more preferably, the cure time may be shorter than 20 minutes.

The thickness of the cured coatings of the invention varies depending on the application and performance requirements, but preferably, ranging from about 1.5 mil to about 10.0 mil, and more preferably, from about 2.0 mil to about 8.0 mil.

In another aspect, the invention provides an article comprising a substrate and a coating from the powder coating composition of the invention applied on at least one surface of the substrate. The coating, upon cure, exhibits a 60° low gloss of no greater than about 60.

Preferably, the article comprises a heat sensitive substrate, and more preferably, a wood substrate, and a coating from the powder coating composition of the invention applied on at least one surface of the substrate. The coating, upon cure, exhibits a 60° gloss of no greater than about 60, preferably, from about 10 to about 40.

More particularly, the cured coating exhibits a pencil hardness of from about H to about 6H, preferably, from about 2H to about 6H, depending on the applications.

In yet another aspect, the invention provides an article comprising a wood substrate and a coating from the composition of the invention applied on at least one surface of the substrate. The coating, upon cure, is substantially free of blooming.

Undesirable blooming appears as a whitish haze or a partially opaque covering on the surface of a cured coating, which diminishes or tarnishes the visibility of the surface, thereby rendering the appearance of the surface unattractive. The whitish haze can sometimes be removed by wiping, but will typically reappear over time. Conventional powder coating compositions comprising a diacid or anhydride thereof as a curative can show blooming, upon cure. It is believed, but not bound by any theory, that the blooming phenomenon in this type of powder coating systems is caused by the migration (i.e., blooming) of the small molecular species such as unreacted diacids to the surface of the substrate. The unreacted diacids may come from an excess of the curing agent, or may be formed from the acid anhydride during cure when the substrate is a moisture containing substrate such as wood. During cure, the moisture from the wood substrate can react with the acid anhydride curing agent to produce diacids, which create a stoichiometric imbalance. The resultant excess diacids tend to migrate to the surface of the coating, thereby producing a haze on the surface of the coating. As long as excess diacids remain in the coating, they will migrate to the surface of the coating at a low rate at room temperature, thus, the blooming would reappear over time.

Surprisingly, by formulating the powder coating composition of the invention, the cured coating on wood substrate formed therefrom is substantially free of blooming, i.e., no visible haze occurs on the cured coating when the coated article is cooled slowly from about 200° F. to about 100° F. in about 30 minutes.

The invention is further illustrated by the following non-limiting examples. It should be understood, however, that many variations and modifications may be made while remaining within the scope of the present invention. All ingredients and components are measured as parts. All the parts and percentages specified herein are by weight unless otherwise stated.

DETAILED DESCRIPTION OF THE EMBODIMENTS OF THE INVENTION

Testing Method

Gloss

The 60° gloss of the cured powder coating of the invention is measured according to the Standard Test Method for Specular Gloss of ASTM D523.

Pencil Hardness

The pencil hardness of the cured powder coating of the invention is measured according to the Standard Test Method for Film Hardness by Pencil Test of ASTM D3363.

Glass Transition Temperature (Tg)

The onset glass transition temperature (Tg) is determined by differential scanning calorimetry.

Acid Number

The acid number of the carboxyl-group containing material used as component (b) in the composition of the invention is measured using the ASTM 4662-98. The acid number is expressed as mg KOH/g.

Blooming

Blooming is tested as follows:

A powder coating composition is coated and cured on a 6"×6"×¾" piece of medium density fiberboard (MDF). Upon cooling to the ambient temperature, a doubled over paper towel is put on the coating surface of the MDF. A 4"×4"×¼" cast iron heat sink heated to about 200° F. is put on the top of paper towel and allowed to cool to about 100° F. in approximately 30 minutes. The coating is then evaluated visually to determine if blooming has occurred and the degree of blooming.

Particle Size Distribution

Particle size distribution is measured by Malvern Mastersizer X from Malvern Instruments Ltd., Worcester, England.

EXAMPLES

Comparative Example 1

A powder coating composition was prepared by pre-mixing 40.3 parts Almatex™ PD-3402 (glycidyl group containing acrylic resin, Anderson Development, Mich.), 34.4 parts GMA-301™ (glycidyl group containing acrylic resin, Estron Chemical Company, Ky.), 25.3 parts Additol® VXL 1381 (dodecanedioic acid anhydride, Hoechst, N.C.), 1.0 part Modarez MFP-A 25 P (flow control additive), 3.0 parts Octaflow ST 70 (stannous catalyst), and 1.5 parts Lancowax TF 1780 (wax). The mixture was then melt blended in a twin-screw extruder at 500 rpm, extruded, cooled, ground and then sieved through 100 mesh sieve to obtain the coating powder designated as A-1.

Using an electrostatic spray coating method, the above-prepared coating powders were then applied onto a 6"×6"×¾" piece of medium density fiberboard, which had been pre-heated in an oven at about 350° F. for about 10 minutes, and cured at about 325° F. for about 12 minutes. The 60° gloss, blooming and pencil hardness of the cured powder coating were tested and the test results are shown in Table I.

Comparative Example 2

A powder coating composition was prepared according to comparative example 1, except that 10.5 parts Uralac® P 5700 (acid functional polyester, DSM Resins, Ga.) was pre-mixed with the other ingredients. The coating powder was designated as A-2. The 60° gloss, blooming and pencil hardness of the cured powder coating was tested and the test results are shown in Table I.

Examples 1–5

Powder coating compositions were prepared by dry blending the coating powder A-1 with Uralac® P5700 in a ratio of 10:1, 10:1.5, 10:2, 10:2.5 and 10:3, respectively. The coating powders were designated as B-1, B-2, B-3, B-4 and B-5, respectively. The 60° gloss, blooming and pencil hardness of the cured powder coatings were tested and the test results are shown in Table I.

Examples 6–10

Powder coating compositions were prepared according to examples 1–5 except that SCX™ 842 (acid functional acrylic resin, Johnson Polymer, Wis.) was used instead of Uralac® P 5700. The coating powders were designated as B-6, B-7, B-8, B-9 and B-10, respectively. The 60° gloss, blooming and pencil hardness of the cured powder coatings were tested and the test results are shown in Table I.

Example 11

A powdered mixture as component 1 was prepared according to comparative example 1, except that no Octaflow ST 70 was added. The mixture was then dry blended with Uralac® P 5700 in a ratio of 10:1 to obtain the powder coating composition of the invention. The coating powder was designated as B-11. The 60° gloss and pencil hardness of the cured powder coating were tested and the test results are shown in Table I.

Example 12

A powdered mixture as component 1 was prepared according to example 11. Separately, a second powdered mixture as component 2 was prepared by pre-mixing 95.0 parts Uralac® P 5700 with 5.0 parts Octaflow ST-70, and then the mixture was extruded, ground and sieved to produce the second powdered mixture. The two powdered mixtures were then added together in the ratio of 10:1 to obtain the powder coating composition of the invention. The coating powder was designated as B-12. The 60° gloss and pencil hardness of the cured powder coating were tested and the test results are shown in Table I.

Example 13

A powder coating composition was prepared by dry-blending the coating powder A-1 obtained according to comparative example 1 with the second powdered mixture obtained according to example 12 in a ratio of 10:1. The coating powder was designated as B-13. The 60° gloss, blooming and pencil hardness of the cured powder coating were tested and the test results are shown in Table I.

Comparative Example 3

A powder coating composition was prepared according to comparative example 1, except that 39.6 parts instead of 40.3 parts Almatex™ PD-3402, 33.8 parts instead of 34.4 parts GMA-301™ and 26.6 parts DDDA (DuPont, Del.) instead of Additol® VXL 1381 were used. The coating powder obtained was designated as A-3. The 60° gloss, blooming and pencil hardness of the cured powder coating were tested and the test results are shown in Table I.

Example 14

A powder coating composition was prepared by dry blending the coating powder A-3 with SCX™ 842 in a ratio of 10:1. The coating powder obtained was designated as B-14. The 60° gloss, blooming and pencil hardness of the cured powder coating were tested and the test results are shown in Table I.

Comparative Example 4

A powder coating composition was prepared by pre-mixing 68.75 parts Almatex™ PD-3402, 31.25 parts Additol® VXL 1381, 1.5 parts Resiflow P-67 (flow control agent), 0.5 parts Uraflow B (degassing agent), and 2.0 parts Octaflow ST-70. The mixture was then melt blended in a twin-screw extruder at 500 rpm, extruded, cooled, ground and then sieved through a 100 mesh sieve to obtain a coating powder designated as A-4. The coating powder was then applied onto a 6"×6"×3/4" piece of medium density fiberboard using the electrostactic spray coating method according to Comparative Example 1. The 60° gloss, blooming and pencil hardness of the cured powder coating were tested and the test results are shown in Table I.

TABLE I

| Ex. No. | Gloss at 60° | Pencil Hardness | Blooming |
|---|---|---|---|
| Com. Ex. 1 | 55 | HB | No |
| Com. Ex. 2 | 58 | 2H | No |
| Ex. 1 | 42 | F | No |
| Ex. 2 | 41 | F | No |
| Ex. 3 | 35 | 2H | No |
| Ex. 4 | 34 | H | No |
| Ex. 5 | 38 | F | No |
| Ex. 6 | 35 | 2H | No |
| Ex. 7 | 27 | 4H–5H | No |
| Ex. 8 | 21 | 4H–5H | No |
| Ex. 9 | 17 | 4H–5H | No |
| Ex. 10 | 16 | 5H | No |
| Ex. 11 | 32 | 2B–3B | — |
| Ex. 12 | 24 | H | — |
| Ex. 13 | 34 | HB | No |
| Com. Ex. 3 | 64 | B | No |
| Ex. 14 | 29 | H | No |
| Com. Ex. 4 | 81 | H | Yes |

The invention claimed is:

1. A powder coating composition comprising:
   a). a first component comprising a melt-blended mixture of
      (i). at least one glycidyl group-containing acrylic resin having epoxide equivalent weight of from about 250 to about 1500 and glass transition temperature of from about 30° C. to about 80° C.; and
      (ii). a curing agent selected from the group consisting of dicarboxylic acids, dicarboxylic acid anhydrides, and mixtures thereof; and
   b). a second component dry-blended with said first component (a), comprising at least one carboxyl-group containing material that has acid number of from about 10 to about 300 and that is not substantially compatible with said first component (a).

2. The powder coating composition of claim 1, wherein said first component (a) further comprises a catalyst.

3. The powder coating composition of claim 1, wherein said second component (b) further comprises a catalyst.

4. The powder coating composition of claim 2, wherein said second component (b) further comprises a catalyst.

5. The powder coating composition of claim 1, wherein said second component (b) further comprises a crosslinker.

6. The powder coating composition of claim 1, wherein said second component (b) is present in an amount of from about 1% to about 40% by weight, based on the total weight of said first component (a) and said second component (b).

7. The powder coating composition of claim 6, wherein said second component (b) is present in an amount of from about 3% to about 25% by weight, based on the total weight of said first component (a) and said second component (b).

8. The powder coating composition of claim 7, wherein said second component (b) is present in an amount of from about 5% to about 20% by weight, based on the total weight of said first component (a) and said second component (b).

9. The powder coating composition of claim 1, wherein said carboxyl-group containing material comprised in second component (b) is selected from the group consisting of carboxyl-group containing polyester resins, carboxy-group containing acrylic resin, and carboxyl-group containing polyethylene and polypropylene.

10. The powder coating composition of claim 9, wherein said carboxyl-group containing material is carboxyl-group containing polyester resins having an acid number or from about 25 to about 250.

11. The powder coating composition of claim 2, wherein said catalyst is selected from the group consisting of stannous octanoate, stannous laurate, stannous stearate, stannous 2-ethylhexanoate, stannous chloride, stannous bromide, and mixtures thereof.

12. The powder coating composition of claim 3, wherein said catalyst is selected from the group consisting of stannous octanoate, stannous laurate, stannous stearate, stannous 2-ethylhexanoate, stannous chloride, stannous bromide, and mixtures thereof.

13. The powder coating composition of claim 1, wherein said ingredient (i) has epoxide equivalent weight of from about 250 to about 800 and glass transition temperature of from about 35° C. to about 65° C.

14. The powder coating composition of claim 1, wherein said composition exhibits, upon cure, a 60° gloss of less than about 55.

15. The powder coating composition of claim 14, wherein said composition exhibits, upon cure, a 60' gloss of from about 10 to about 40.

16. The powder coating composition of claim 1, wherein said composition exhibits, upon cure, a pencil hardness of from about H to about 6H.

17. The powder coating composition of claim 16, wherein said composition exhibits, upon cure, a pencil hardness of from about 2H to about 6H.

18. The powder coating composition of claim 1, wherein the curing agent (ii) is a dicarboxylic acid anhydride and the stoichiometric ratio of the curing agent (ii) to the glycidyl groups existing in ingredient (i) being from about 0.4 to about 0.7.

19. The powder coating composition of claim 18, wherein said composition exhibits, upon cure on wood substrate, a substantially free of blooming appearance.

20. The powder coating composition of claim 1, wherein the stoichiometric ratio of the curing agent (ii) to the glycidyl groups existing in component (i) is from about 0.7 to about 1.5.

21. The powder coating composition of claim 1, wherein the curing agent (ii) is selected from the group consisting of succinic acid, adipic acid, azelaic acid, sebacic acid, eicosanedioic acid, dodecanedioic acid, glutaric acid, pimelic acid, and anhydrides thereof.

22. The powder coating composition of claim 1, wherein said second component (b) has a particle size of from about 0.1 micron to about 250 micron.

23. The powder coating composition of claim 22, wherein said second component (b) has a particle size of from about 1 micron to about 100 micron.

24. The powder coating composition of claim 23, wherein said second component (b) has a particle size of from about 5 micron to about 60 micron.

* * * * *